United States Patent [19]

Hillekamp

[11] 4,384,923

[45] May 24, 1983

[54] PROCESS FOR THE HYGIENIZATION OF CARBONATION SLUDGES

[75] Inventor: Klaus Hillekamp, Munich, Fed. Rep. of Germany

[73] Assignee: Deutsche Kommunal-Anlagen Miete GmbH, Munich, Fed. Rep. of Germany

[21] Appl. No.: 280,187

[22] Filed: Jul. 6, 1981

[30] Foreign Application Priority Data

Jul. 3, 1980 [DE] Fed. Rep. of Germany ....... 3025263
Jul. 11, 1980 [DE] Fed. Rep. of Germany ....... 3026383
Jun. 16, 1981 [EP] European Pat. Off. ......... 811046648
Jun. 16, 1981 [DE] Fed. Rep. of Germany ....... 3123767

[51] Int. Cl.³ ..................... C10B 47/28; C10B 53/00; C10B 57/06; C10B 57/10
[52] U.S. Cl. ........................ 201/15; 48/209; 201/21; 201/25
[58] Field of Search ................ 201/2, 5, 15, 20, 21, 201/25, 27, 41; 48/209; 585/240, 241

[56] References Cited

U.S. PATENT DOCUMENTS 3,733,271 5/1973 Olsen ...................... 201/21
4,123,332 10/1978 Rotter ..................... 201/25
4,272,322 6/1981 Kobayashi ............... 201/25

FOREIGN PATENT DOCUMENTS 92238 3/1893 Fed. Rep. of Germany .
2260616 6/1974 Fed. Rep. of Germany ........ 201/25
2832414 1/1980 Fed. Rep. of Germany ........ 201/25
2835267 2/1980 Fed. Rep. of Germany ........ 201/25
2844741 4/1980 Fed. Rep. of Germany ........ 201/25
2855510 4/1980 Fed. Rep. of Germany ........ 201/25
484262 2/1970 Switzerland .

OTHER PUBLICATIONS

Thome-Kozmiensky; "Ansatz Einer Systemanalytischen ... Abfallbeseitigung"; Müll und Abfall; Mar. 1976.

Primary Examiner—Bradley Garris
Attorney, Agent, or Firm—Sughrue, Mion, Zinn, Macpeak & Seas

[57] ABSTRACT

The invention relates to a process for the hygienization of carbonation sludges. For this purpose, these are mixed with wastes having a high calorific value and containing organic substances and are decomposed by pyrolysis, in the absence of air, at a temperature from 200° C. to 800° C., preferably 250° C. to 720° C.

The fuel gases obtained in the decomposition by pyrolysis can be utilized for external heating of the thermal reactor, autothermic operation, that is to say self-sustaining operation, becoming possible when wastes of high calorific value are added to the carbonation sludge in such a quantity that the calorific value of the waste mixture is more than 1,000 kcal/kg.

19 Claims, No Drawings

PROCESS FOR THE HYGIENIZATION OF CARBONATION SLUDGES

BACKGROUND OF THE INVENTION

1. Field of the Invention

The invention relates to a process for the hygienization of carbonation sludges by a thermal treatment.

2. Description of the Prior Art

In the production of sugar from sugar beet or sugar cane in the sugar industry; the so-called raw juice is initially obtained. This raw juice contains impurities, mainly organic compounds, such as sucrose and protein, as well as phosphoric acid.

This raw juice is purified by adding milk of lime thereto, which binds the impurities. After carbonic acid has been introduced, calcium carbonate and calcium phosphate precipitate together with the other impurities, a fine sludge being formed which is called carbonation sludge.

This carbonation sludge thus represents a primary product from the purification of sugar and it consists in general of 50% of water, 40% of calcium carbonate and 10% of organic constituents. The organic constituents are mainly composed of sucrose and aminoglucose. In addition, the carbonation sludge contains phosphate in a quantity of 0.7% by weight, included in the calcium carbonate figure.

The carbonation sludge is thickened, with the aid of drum filters, to give a mass which can be pumped, and it is finally dumped in large sludge ponds. In these so-called settling ponds, the water slowly seeps into the ground and, during the summer months, it also evaporates. This manner of waste disposal entails considerable environmental problems:

serious odor nuisances arise during fermentation and digestion;

the water seeping into the subsoil can endanger the ground water; and due to the high oxygen demand during fermentation and digestion of the sludge, the settling ponds require considerable areas.

SUMMARY OF THE INVENTION

It is the object of the present invention to provide a process for the hygienization of carbonation sludges, which does not pollute the environment and which can be carried out with a low energy consumption. According to the invention, this object is achieved when the carbonation sludges are mixed with wastes having a high calorific value and containing organic substances, and the mixture is decomposed by pyrolysis, in the absence of air, at a temperature from 200° C. to 800° C., preferably 250° C. to 720° C. The term "decomposition by pyrolysis" has the same meaning as "degasification".

DESCRIPTION OF PREFERRED EMBODIMENTS

The invention provides a process which makes possible an unobjectionable and rapid hygienization of a carbonation sludge and in which the calcium carbonate and phosphate in the carbonation sludge at the same time neutralize the inorganic acids hydrogen chloride, hydrogen fluoride and sulfur dioxide, which result from the acid-forming compounds in the wastes having a high calorific value, and bind these into the residue of the decomposition by pyrolysis.

Moreover, the danger of an emission of heavy metals is avoided, since these are reacted with calcium carbonate and calcium phosphate to give compounds of low volatility, which moreover are not decomposed at the low process temperatures used. The carbonization gases which are formed during the pyrolysis and have a high calorific value can therefore be further utilized as the fuel gas, without any danger and without the necessity of additional expensive and energy-consuming purification processes. Due to the utilization of the calorific value of the wastes of high calorific value, a very favorable overall energy balance is thus obtained.

The residue is also stabilized against leaching out of heavy metals, since the latter are reacted with calcium carbonate and calcium phosphate to give compounds of low volatility, which are not decomposed at the process temperatures.

Admittedly, the degasification of wastes which contain organic substances of high calorific value is known. However, this produces likewise gaseous noxious substances, such as hydrogen chloride, hydrogen fluoride, hydrogen sulfide and sulfur dioxide, as well as heavy metals which are soluble in the solid residues and which, after dumping, are leached out by contact with rain water and can then pass into the ground water and surface waters. It is also possible that corrosive liquids are formed when the gaseous, noxious substances listed above are condensed. When emitted into the atmosphere, these noxious substances are detrimental to man, animals and plants. Pollution of the environment also results when they pass into water, as in the wet scrubbing of, for example, the carbonization gases. For this reason, the plants for carrying out degasification processes of this type must be equipped with gas purification units, based on wet scrubbing, which are expensive in material costs and operating costs. Admittedly, the fuel gas obtained on degasification can, after purification, be burned within the plant for heating the reactor and/or for the production of steam or even electricity, but it is not always possible to use the fuel gas, or alternatively the steam generated economically, so that overall the degasification of wastes entails considerable disadvantages which stand in the way of a universal applicability of this process.

Furthermore, Swiss Patent Specification No. 484,262 has disclosed the possibility of gasifiying refuse, if appropriate, together with sludge. Since reaction temperatures of at least 800° C., and on average 900° C. to 1,000° C., occur during gasification which is a partial combustion, use of this process for the hygienization of carbonation sludges is totally unsuitable since, at the high reaction temperatures mentioned, reactions occur which are undesirable and also entail considerable energy consumption.

These undesirable reactions also include the decomposition of calcium carbonate at temperatures above 800° C., to give carbon dioxide and calcium oxide. This process, industrially known as burning of lime, requires a considerable supply of energy and, in the present process, gives a low-grade fuel gas which is enriched in carbon dioxide and can hardly be used further. At the same time, a burnt lime is formed which is contaminated with inorganic residues and is valueless. Since wastes of high calorific value, such as domestic refuse, bark, paint sludges, old tires, rubber, plastics, acid resins, waste oil, organic shredder wastes and the like, also contain the elements chlorine, fluorine and sulfur, and in some cases also traces or significant quantities of heavy metals, the high reaction temperatures mentioned for gasification would lead to a decomposition of the chlorides, fluorides and sulfates formed, so that a high emission of corresponding gaseous pollutants of the elements listed would take place. In addition, the emission of the heavy metals zinc, lead, cadmium and mercury would increase, and highly toxic dioxins would be formed. The gasification of the carbonate sludges together with refuse of high calorific values would therefore result in considerable and unacceptable environmental pollution or necessitate purification measures which are expensive in equipment and additionally would have a high energy demand in practice.

The process according to the invention is therefore not even suggested by the state of the art cited above.

The process according to the invention can be carried out in externally heated reactors, such as rotary kilns, chamber furnaces, retorts and shaft furnaces. The degasification of the mixture of carbonation sludges and wastes can be carried out either under a reduced pressure in the reactor or under an elevated pressure.

Suitable wastes of high calorific value are all those waste materials the pyrolysis of which proceeds with an increase in energy, for example domestic refuse, commercial wastes similar to domestic refuse, waste wood in the most diverse forms, organic shredder wastes, paint sludges, waste oil, acid resins, plastics, old tires, bleaching earths from the first and second refining stages, and the like, as well as mixtures thereof.

The waste materials listed can be used in a solid, pasty or liquid form. If lifquid waste materials are used, it is necessary, depending on the type of reactor, to mix these with solid waste materials in order to prevent the liquid from running quickly through the hot part of the reactor. Lumpy or excessively bulky material, such as, for example, waste wood, must be comminuted beforehand. This also applies to old tires, the size of which must be adapted to the reactor inlet.

The calorific value Hu of the wastes listed can vary within a wide range from 1,000 kcal/kg to 8,000 kcal/kg. The following average calorific values of selected waste materials can serve as a starting point:
Domestic refuse: 1,800 kcal/kg
PVC: 4,500 kcal/kg
Polyethylene: 8,000 kcal/kg
Organic shredder wastes: 4,500–6,000 kcal/kg
Waste oil: 8,000–9,000 kcal/kg Acid resins: 4,000 kcal/kg
Bleaching earths: 3,400–5,000 kcal/kg
Old tires: 7,000–8,500 kcal/kg.

In the pyrolysis of these waste materials, carbonization gases are formed in sometimes considerable amounts, and these have a considerable calorific value which can vary from 2,000 to 10,000 kcal/Nm$^3$.

The wastes also contain elements which normally are set free on degasification and then partially also pass into the gas phase. One of these elements is chlorine which appears as hydrogen chloride. Chlorine is present, for example, in a concentration of 0.4% by weight in domestic refuse, and in a quantity of 57% by weight of PVC.

Sulfur is another interfering element. Its proportion in domestic refuse is 0.2 to 0.75% by weight, that in old tires is 1 to 2% by weight and that in acid resins is 12 to 17% by weight.

Fluorine is a further component of the wastes, which gives rise to the formation of intefering noxious substances. Its proportion in domestic refuse is 0.08% by weight, and is as high as 76% by weight in Teflon.

An additional point is that the wastes contain heavy metals. Plastics contain, for example, cadmium and lead in different quantities. In the case of acid resins, a zinc and lead content of 600 to 1,100 ppm and 700 to 8,200 ppm respectively must be expected. Waste oils normally contain lead in a quantity of 0.1 to 0.3% by weight.

For carrying out the process according to the invention in practice, it has proved to be particularly advantageous when, if acid resins are used, these are mixed with carbonation sludge outside the thermal reactor and the decomposition by pyrolysis takes place only after the evolution of CO$_2$ has ended. The reason for this is that considerable quantities of carbon dioxide are evolved when, acid resins are mixed with the carbonation sludge; if the mixing is carried out in the thermal reactor, these quantities of carbon dioxide would lead to a considerable dilution of the re-usable fuel gas formed with the non-combustible carbon dioxide.

Advantageously, a thixotropic carbonation sludge is used for carrying out the process, since this sludge is obtained directly in the sugar industry, after the treatment in drum filters. In this form, it contains about 50% of water, 40% by weight of calcium carbonate and 10% by weight of organic material.

This sludge can be extensively dehydrated in high-performance chamber filter presses.

It is possible to lower the water content down to 20%. The calcium carbonate content is then 64% by weight and the organic content is 16% by weight.

For carrying out the process, the sludge can be introduced in a liquid, pumpable state into the reaction chamber.

The calcium carbonate also contains small amounts of phosphates. In total, the content of phosphate, sand and sulfates, relative to the solids content of the carbonate sludge, is 4% by weight, and that of the phosphates is 0.7% by weight.

The organic content of the carbonation sludge is about 20% by weight, relative to solid matter, and is essentially composed of sucrose and aminoglucose. The proportion of sucrose in the organic part is about 20% by weight, and that of aminoglucose is about 80% by weight.

The calorific value Hu of the organic content of the carbonation sludge is 3,500 kcal/kg. The calorific value Hu of a carbonation sludge containing 50% of water is only 60 to 100 kcal/kg. The calorific value of a carbonation sludge which has been dehydrated to a water content of 20% is about 400 to 450 kcal/kg.

As a result of the manner of formation of the carbonation sludge from milk of lime and raw juice from the sugar industry, with the introduction of carbonic acid and the precipitation of the organic substances, as well as the calcium phosphate formed by neutralization of phosphoric acid, a product results in which all the constituents are present together in a very fine state and in ideal thorough mixing. Because of their extremely fine distribution, the inorganic constituents, namely calcium carbonate and calcium phosphate, are present in a very reactive form. This means that, for the quoted intended purposes and objects in the treatment of the wastes of high calorific value, they are capable of reacting to a particularly great extent and preferentially with the interfering elements and heavy metals. The effect of this ideal combination with phosphate, as a precipitation agent and binder for heavy metals, is further reinforced by the fact that the organic proportion is decomposed during the thermal treatment. Since this decomposition proceeds with an evolution of gas, a new surface is continually created during the thermal treatment of the wastes with carbonation sludge, and this has a particularly favorable effect on the reactions, in the sense explained.

Carbonation sludge can be mixed within a wide range with the wastes of high calorific value. The wastes can be mixed with the carbonation sludge either in the reactor or even upstream of the reactor.

In addition to the carbonation sludge, a further additive for the purpose of binding acid-forming substances, such as, for example, basic materials or potentially acid-binding materials, can also be added; these are decribed, in particular, in German Patent Application No. P 30 25 263.2.

Particularly suitable for this purpose are acid-binding alkali compounds which react with the acid-forming substances liberated during the decomposition of the organic materials, salts being formed which are resistant to hydrolysis and thermally stable, or potentially acid-binding alkali compounds are suitable which decompose at an elevated temperature to give metal oxides which have a basic reaction and which react with the acid-forming substances produced during the decomposition of the organic materials, salts being formed. Possible acid-binding alkali compounds are especially salts which melt in the temperature range from 200° C. to 800 ° C., in particular from 250° C. to 720° C., such as alkali metal formates, for example sodium formate, alkali metal acetates, alkali metal nitrites, for example sodium nitrite, alkali metal nitrates, sodium hydroxide and/or sodium bicarbonate. Potentially acid-binding substances which can be used are in particular alkali metal salts of organic acids, having an oxidizing action, alkali metal alcoholates, alkali metal alkyls and/or organic complex compounds of alkali metal compounds. Sodium carbonate is also suitable.

The acid-binding alkali metal compounds can also be used as cutectic mixtures. Advantageously, the acid-binding alkali metal compounds are added as solutions, preferably as aqueous solutions, or as powders to the organic materials, or they are introduced into the reaction chamber.

The acid-binding alkali metal compounds are advantageously added in a quantity which is 0.25 to 10 times, preferably 0.5 to 5 times, the stoichiometric quantity relative to the acid or acids to be bound. To compact the residue, acid-binding calcium compounds can additionally be added.

The acid materials which are formed during the decomposition of the organic constituents by pyrolysis, such as hydrogen chloride, hydrogen fluoride, hydrogen sulfide and sulfur dioxide react with the finey divided calcium carbonate of the carbonation sludge and remain as calcium salts in the degasification residue. The heavy metals which are present in the wastes and measurable quantities of which are already emitted at temperatures from 300° C. to 600° C., for example as in the case of cadmium, are bound as carbonates, but preferably as phosphates, by corresponding reactions with the calcium phosphates at the high reaction temperatures of 300° C. to 600° C. The solubility of the heavy metal phosphates is so low that they are not leached when they come into contact with rain-water. An additional point is that heavy metal phosphates are hardly soluble in acid, in contrast to heavy carbonates.

There is thus no dissolution due to carbonic acid. A temporary, brief or longer-lasting change in the pH value of the residue can no longer lead to dissolution phenomena.

The binding of the heavy metals lead, copper, mercury, nickel, cobalt, cadmium and zinc as sparingly soluble phosphates is a particular advantage of the process. A further advantage of the presence of phosphates in the reaction chamber is that the formation and emission of toxic heavy metal aerosols which could pass into the lungs is largely avoided.

Depending on the type of the noxious substances, a suitable stoichiometric ratio will be selected and the quantity to be added of carbonation sludge will be fixed correspondingly, in order to utilize the carbonation sludge in the manner described above with particular effectiveness for the in situ purification of the fuel gas formed, by removal of acid noxious substances, and for the binding of the latter, and in order to stabilize the residue effectively against the leaching-out of heavy metals. Thus, for example, chlorine-containing wastes of high calorific value can advantageously be added to the carbonation sludge in such a quantity, relative to the chlorine content, that the stoichiometric ratio of chlorine—calculated as hydrogen chloride—to calcium carbonate is 0.25 to 20.

According to a preferred further development of the process, the carbonation sludge can also be mixed with such a quantity of wastes that the stoichiometric ratio of the total quantity of chlorine calculated as hydrogen chloride, of fluorine calculated as hydrogen fluoride and of sulfur calculated as sulfuric acid to the carbonation sludge is 0.25 to 20.

For the purpose of binding heavy metals into the residue, it is particularly advantageous when such a quantity of carbonation sludge is added to the wastes of high calorific value that the stoichiometric ratio of the heavy metals, which are to be bound, to the calcium phosphate in the carbonation sludge is 0.2 to 5, preferably 0.25 to 3.

The carbonization gas formed during the decomposition by pyrolysis can be passed on as fuel gas to any possible consumers. According to a particularly preferred embodiment of the process according to the invention, it is utilized, wholly or partially, for heating the thermal reactor in which the pyrolysis is carried out. If the fuel gases are obtained in a state of sufficient purification, as a result of maintaining appropriate stoichiometric ratios, a subsequent purification thereof is as a rule not necessary.

If the full calorific value of the wastes of high calorific value is to be utilized for a dehydration and hygienization of the carbonation sludge, the carbonation sludge and the waste are in an advantageous manner mixed in such a quantity that the pyrolysis proceeds autothermically (self-sustainingly) with utilization of the calorific value of the wastes of high calorific value. The term autothermic is here to be understood as meaning that such a quantity of fuel gas is produced during the pyrolysis that dehydration and complete decomposition of the organic constituents of the wastes introduced and of the carbonation sludge is ensured. In general, it can be assumed that the lower limit for a self-supporting pyrolysis is an Hu of about 1,000 to 1,200 kcal/kg. Accordingly, it is advantageous to add such a quantity of carbonation sludge to the wastes of high calorific value that the calorific value does not fall below this figure. If, however, the waste mixtures used, consisting of wastes and carbonation sludge, have a calorific value below 1,000 kcal/kg, external energy must be supplied.

Under certain circumstances, it is expedient to pre-dry the carbonation sludge by utilizing the waste heat which is to be removed from the unit, or by proportionate combustion of fuel gas.

The examples which follow are intended to explain the invention in more detail:

EXAMPLE 1

260 g of carbonation sludge, obtained in the purification of sugar beet raw juice and having a water content of 26.8% and an organic proportion of about 12%, were thermally treated, in the absence of air, in an electrically heated furnace which had a temperature gradient of 10°/minute. By means of curves of weight loss, it was found here that it was possible to expel the water completely in the temperature range from 90° C. to 200° C. The decomposition of the organic material started just above 200° C. and was completed at 550° C. A black-grey residue remained which was completely odorless and no longer contained any fermentable organic substance.

Further heating in the absence of air showed that the decomposition of calcium carbonate starts about 800° C. and, under the experimental conditions indicated, was complete at 910° C.

EXAMPLE 2

A mixture having a chlorine content of 2% by weight was prepared from 48 g of cellulose and 1.76 g of polyvinyl chloride. 1.57 g of commercially available limestone powder having a calcium carbonate content of 90% were added to this mixture. The stoichiometric ratio of the theoretical amount of hydrogen chloride originating from the PVC to the calcium carbonate of the limestone powder was 1.

This mixture was uniformly heated in the course of 45 minutes from 20° C. to 650° C., in the absence of air. A black residue remained which contained 32% of the chlorine introduced with the PVC.

EXAMPLE 3

38.1 g of cellulose and 1.73 g of PVC (chlorine content 57%) were mixed. 2.38 g of carbonation sludge were also added to this. The water content of the carbonation sludge used was 26% by weight, and the proportion of calcium carbonate was 59% by weight.

The stoichiometric ratio of the theoretically possible quantity of hydrogen chloride originating from the PVC to the quantity of calcium carbonate in the carbonation sludge was 1.

After thorough mixing of all the components, this mixture was heated uniformly in the course of 45 minutes from 20° C. to 650° C., in the absence of air. A black residue remained which contained 38% of the chlorine introduced with the PVC.

A comparison of Experiments 2 and 3 shows that it is possible to obtain a more effective binding of chlorine in the residue with the use of carbonation sludge than with the use of limestone powder.

EXAMPLE 4

48.2 g of cellulose and 1.76 g of PVC (chlorine content 56%) were mixed. 7.18 g of carbonation sludge were also added to this mixture. The carbonation sludge in this case had a water content of 26% by weight and had an effective calcium carbonate content of 59%. The stoichiometric ratio of the theoretically possible quantity of hydrogen chloride originating from the PVC to the calcium carbonate in the carbonation sludge was 3.

After thorough mixing of all the components, the mixture was uniformly heated in the course of 45 minutes from 20° C. to 650° C. This gave a black residue which contained 45% of the chlorine introduced with the PVC.

I claim:

1. A process for the thermal treatement of carbonation sludge obtained from the purification of raw juice from sugar refining to hygienize the same which comprises mixing the carbonation sludge with waste having a high calorific value and containing organic substances, wherein the resulting mixture is decomposed by pyrolysis, in the absence of air, at a temperature of from 200° C. to 800° C. thereby obtaining solid residues and combustible fuel gases.

2. The process of claim 1, wherein said temperature is from 250° C. to 720° C.

3. The process of claim 1, wherein said waste comprises an acid resin, and the mixing thereof with the carbonation sludge is carried out outside a thermal reactor in which the thermal treatment takes place, further wherein $CO_2$ is evolved and where decomposition of the mixture by pyrolysis takes place only after the evolution of $CO_2$ has ended.

4. The process of claim 1, wherein a thixotropic carbonation sludge is used.

5. The process of claim 1, wherein said carbonation sludge contains calcium carbonate and wherein said waste contains chlorine, the waste being added to said carbonation sludge in such quantity that the stoichiometric ratio of the chlorine, calculated as hydrogen chloride, to the calcium carbonate is 0.25 to 20.

6. The process of claim 1, wherein said waste contains chlorine, fluorine and sulfur and the carbonation sludge contains calcium carbonate, the waste being added to the carbonation sludge in an amount such that the stoichiometric ratio of chlorine, calculated as hydrogen chloride, fluorine, calculated as hydrogen fluoride, and sulfur, calculated as sulfuric acid, to calcium carbonate is 0.25 to 20.

7. The process of claim 1, wherein there is further added to the mixture which is to be decomposed by pyrolysis a material which will bind acid-forming substances.

8. A process as claimed in claim 1, wherein the waste contains heavy metals and the carbonation sludge contains calcium phosphate, the ratio of carbonation sludge to waste being such that the stoichiometric ratio of the heavy metals which are bound to the calcium phosphate is 0.2 to 5.

9. The process of claim 8, wherein said ratio is 0.25 to 3.

10. The process of claim 1, wherein said fuel gases are utilized at least in part for heating a thermal reactor in which the pyrolysis is carried out.

11. The process of claim 10, wherein the fuel gases are used to externally heat the thermal reactor.

12. The process of claim 11, wherein the fuel gases are utilized without purifying the same for said heating.

13. The process of claim 1, wherein the carbonation sludge is added to the waste in such quantity that the calorific value, Hu, of the resulting mixture is greater than 1,000 kcal/kg, whereby autothermic pyrolysis is effected.

14. The process of claim 1, wherein the carbonation sludge is dried.

15. The process of claim 1, wherein said carbonation sludge primarily comprises water, calcium carbonate and organic constituents which primarily comprise sucrose and aminoglucose.

16. The process of claim 1, wherein said pyrolysis is conducted in an externally heated reactor.

17. The process of claim 1, wherein said waste has a calorific value of 1,000 kcal/kg to 8,000 kcal/kg.

18. The process of claim 17, wherein the fuel gases resulting from said pyrolysis have a calorific value of from 2,000 to 10,000 kcal/Nm$^3$.

19. The process of claim 1, wherein said carbonation sludge is in a very fine state whereby the same is highly reactive.

* * * * *